(12) United States Patent
Tillich et al.

(10) Patent No.: US 10,082,217 B2
(45) Date of Patent: *Sep. 25, 2018

(54) HIGH-TEMPERATURE AND HIGH-VIBRATION CAPABLE ARMATURE ASSEMBLIES FOR TORQUE MOTOR VALVE ACTUATORS WITH INCREASED WINDING VOLUME

(71) Applicant: HONEYWELL INTERNATIONAL INC., Morris Plains, NJ (US)

(72) Inventors: Sammuel Tillich, La Porte, IN (US); Donna Laboda, Niles, MI (US); Nicholas Wilson, Three Rivers, MI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,808

(22) Filed: Dec. 8, 2016

(65) Prior Publication Data

US 2018/0163887 A1 Jun. 14, 2018

(51) Int. Cl.
*F16K 31/06* (2006.01)
*F16K 31/04* (2006.01)
(Continued)

(52) U.S. Cl.
CPC ........ *F16K 31/043* (2013.01); *F16K 31/0682* (2013.01); *F16K 31/10* (2013.01);
(Continued)

(58) Field of Classification Search
CPC .... F16K 31/0682; F16K 31/10; F16K 31/105; Y10T 137/2278; H01F 7/14
See application file for complete search history.

(56) References Cited

U.S. PATENT DOCUMENTS

| 2,767,689 A | 10/1956 | Moog |
| 2,924,241 A | 2/1960 | Bauer |

(Continued)

FOREIGN PATENT DOCUMENTS

| DE | 909658 C | 4/1954 |
| DE | 3323982 A1 | 1/1985 |

(Continued)

OTHER PUBLICATIONS

Extended EP Search Report for Application No. 16151578.8-1751 dated Jun. 16, 2009.

(Continued)

*Primary Examiner* — Matthew W Jellett
(74) *Attorney, Agent, or Firm* — Lorenz & Kopf, LLP (57) ABSTRACT

A torque motor valve actuator for use with a valve assembly is provided. The torque motor valve actuator includes an armature spring having a first end portion, a second end portion and a rigid central portion. The first end portion and the second end portion are coupled to the rigid central portion by a respective flexible portion, and the rigid central portion defines a bore that extends along a first axis. The torque motor valve actuator includes an armature having a first end and a second end. The armature extends along a longitudinal axis that is substantially parallel to the first axis of the bore, and the armature is coupled to the bore of the armature spring between the first end and the second end.

20 Claims, 6 Drawing Sheets

(51) Int. Cl.
  *H01F 7/14* (2006.01)
  *F16K 31/10* (2006.01)

(52) U.S. Cl.
  CPC .............. *F16K 31/105* (2013.01); *H01F 7/14* (2013.01); *H01F 7/145* (2013.01); *Y10T 137/2278* (2015.04)

(56) References Cited

U.S. PATENT DOCUMENTS

| | | | |
|---|---|---|---|
| 2,962,611 | A | 11/1960 | Atchley |
| 3,081,787 | A | 3/1963 | Meulendyk |
| 3,103,603 | A | 9/1963 | Reutter |
| 3,209,782 | A | 10/1965 | Wolpin et al. |
| 3,323,090 | A | 5/1967 | O'Brien |
| 3,377,882 | A | 4/1968 | Schrempp |
| 3,517,359 | A | 6/1970 | Trbovich et al. |
| 3,714,610 | A * | 1/1973 | Duff ............... H01F 7/14 335/229 |
| 3,777,784 | A | 12/1973 | Nicholson |
| 3,878,412 | A | 4/1975 | Kurpanek |
| 3,910,314 | A | 10/1975 | Nicholson |
| 3,938,778 | A | 2/1976 | Hansen |
| 4,362,182 | A | 12/1982 | Sjolund |
| 4,378,031 | A | 3/1983 | Nicholson et al. |
| 4,403,204 | A | 9/1983 | Crawshaw |
| 4,527,772 | A | 7/1985 | Kebede et al. |
| 4,560,969 | A | 12/1985 | Nicholson |
| 4,794,941 | A | 1/1989 | Godon |
| 4,796,664 | A | 1/1989 | Toews |
| 4,997,002 | A | 3/1991 | Blatter et al. |
| 5,184,645 | A | 2/1993 | Boerschig |
| 5,465,757 | A | 11/1995 | Peters |
| 5,687,960 | A | 11/1997 | Moon |
| 5,697,401 | A | 12/1997 | Shinoda et al. |
| 6,246,131 | B1 | 6/2001 | Sheng |
| 6,321,767 | B1 | 11/2001 | Seid et al. |
| 6,791,422 | B2 | 9/2004 | Schmidt |
| 6,974,117 | B2 | 12/2005 | Dzialakiewicz et al. |
| 7,795,538 | B2 | 9/2010 | Kaiser et al. |
| 8,485,201 | B2 | 7/2013 | Wyatt et al. |
| 8,505,573 | B2 | 8/2013 | Herbert et al. |
| 8,572,838 | B2 | 11/2013 | Piascik et al. |
| 9,328,839 | B2 | 5/2016 | Arend et al. |
| 9,574,676 | B2 * | 2/2017 | Laboda .............. F16K 31/06 |
| 2004/0056048 | A1 | 3/2004 | Kaartinen |
| 2006/0273539 | A1 | 12/2006 | Barth et al. |
| 2008/0116882 | A1 | 5/2008 | Taylor et al. |
| 2010/0156580 | A1 | 6/2010 | Bill et al. |
| 2013/0048891 | A1 | 2/2013 | Druhan et al. |
| 2016/0215898 | A1 | 7/2016 | Laboda et al. |

FOREIGN PATENT DOCUMENTS

| | | |
|---|---|---|
| DE | 20000397 U1 | 4/2000 |
| GB | 2142780 A | 1/1985 |

OTHER PUBLICATIONS

USPTO Office Action for U.S. Appl. No. 14/603,894 dated May 19, 2016.
USPTO Notice of Allowance for U.S. Appl. No. 14/603,894 dated Oct. 14, 2016.
USPTO Office Action, Notification dated Sep. 17, 2015; U.S. Appl. No. 14/150,139.
Extended EP Search Report for Application No. 15150221.8-1809/ 2894774 dated Apr. 16, 2018.
Liu, Chein-Shan; Elastic Torsion Bar with Arbitrary Cross-Section Using the Fredholm Integral Equations; CMC, vol. 5, No. 1, pp. 31-42, 2007; Copyrightc 2007 Tech Science Press.

\* cited by examiner

HIGH-TEMPERATURE AND HIGH-VIBRATION CAPABLE ARMATURE ASSEMBLIES FOR TORQUE MOTOR VALVE ACTUATORS WITH INCREASED WINDING VOLUME

TECHNICAL FIELD

The present disclosure generally relates to torque motor valve actuators, and more particularly relates to high-temperature and high-vibration capable armature assemblies for torque motor valve actuators of valve assemblies having an increased winding volume.

BACKGROUND

Torque motor valve actuators may be used in various systems and operating environments. For example, many engine air valves associated with an aircraft gas turbine engine are controlled using torque motor valve actuators. In certain embodiments, a torque motor valve actuator includes a plurality of coils and an armature. The coils are controllably energized to control the rotational position of the armature.

In many instances, aircraft engine air valves are mounted near the engine. Due to the relatively high temperatures near the engine, the torque motor valve actuators associated with the engine air valves are remotely mounted. This remote mounting may increase the overall cost and complexity of the system. High temperature environments may also directly impact the power requirements of the torque motor. As the temperature increases, coil resistance increases, which results in increased power demands and higher internal power dissipation.

Accordingly, it is desirable to provide an improved torque motor valve actuator, which is operable in relatively high temperatures and high vibration environments and can be mounted directly to the air valves. In addition, it is desirable to provide a torque motor valve actuator that has an increased winding volume, such that a larger diameter wire may be employed, which reduces coil resistance and power requirements. Furthermore, other desirable features and characteristics of the present invention will become apparent from the subsequent detailed description and the appended claims, taken in conjunction with the accompanying drawings and the foregoing technical field and background.

SUMMARY

In one embodiment, a torque motor valve actuator for use with a valve assembly is provided. The torque motor valve actuator includes an armature spring having a first end portion, a second end portion and a rigid central portion. The first end portion and the second end portion are coupled to the rigid central portion by a respective flexible portion, and the rigid central portion defines a bore that extends along a first axis. The torque motor valve actuator includes an armature having a first end and a second end. The armature extends along a longitudinal axis that is substantially parallel to the first axis of the bore, and the armature is coupled to the bore of the armature spring between the first end and the second end.

Also provided is a torque motor valve actuator for use with a valve assembly. The torque motor valve actuator includes an armature spring having a first end portion, a second end portion and a central portion. The first end portion and the second end portion are coupled to the central portion by a respective flexible portion, and the central portion defines a bore that extends along a first axis. The torque motor valve actuator includes an armature having a first end and a second end. The armature extends along a longitudinal axis that is substantially parallel to the first axis of the bore, and the armature is fixedly coupled to the bore of the armature spring between the first end and the second end. The torque motor valve actuator includes a flapper element coupled to the second end of the armature such that rotation of the armature moves the flapper element.

Further provided is a torque motor valve actuator for use with a valve assembly. The torque motor valve actuator includes an armature spring having a first end portion, a second end portion and a rigid central portion. The first end portion and the second end portion are coupled to the rigid central portion by a respective flexible portion. The rigid central portion defines a bore that extends along a first axis, and the rigid central portion of the armature spring includes a first rigid portion end and a second rigid portion end. The bore is defined between the first rigid portion end and the second rigid portion end. The torque motor valve actuator includes an armature having a first end and a second end. The armature extends along a longitudinal axis that is substantially parallel to the first axis of the bore, and the armature is coupled to the bore of the armature spring between the first end and the second end. The torque motor valve actuator includes an actuator housing that defines a first bore that extends from a first housing end to a second housing end and receives the armature, and a second bore defined between the first housing end and the second housing end that intersects the first bore and receives the armature spring. The torque motor valve actuator also includes at least one magnetic pole piece positioned at one of the first housing end and the second housing end.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses.

Furthermore, there is no intention to be bound by any expressed or implied theory presented in the preceding technical field, background, brief summary or the following detailed description. In addition, those skilled in the art will appreciate that embodiments of the present disclosure, such as the armature assembly, may be practiced in conjunction with any type of torque motor value actuator and valve assembly, and that the armature assembly described herein for use with a gas turbine engine is merely one exemplary embodiment according to the present disclosure. Moreover, while the armature assembly is described herein as being used with torque motor value actuator and valve assembly of a gas turbine engine onboard a mobile platform or vehicle, such as a bus, motorcycle, train, motor vehicle, marine vessel, aircraft, rotorcraft and the like, the various teachings of the present disclosure can be used with a gas turbine engine associated with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

The various teachings of the present disclosure provide high-temperature and high-vibration capable armature assemblies for torque motor valve actuators of valve assemblies for use with a gas turbine engine, which have an increased winding volume. As will be discussed, the armature assembly associated with the torque motor valve actuator provides increased winding volume due to a coupling arrangement between an armature and an armature spring of the armature assembly. The armature assembly according to exemplary embodiments of the present disclosure as described herein provides a relatively low armature torsional rate at high temperatures (e.g., greater than 800° Fahrenheit (F) while also being able to withstand high vibration environments (225G harmonic response input the base of the torque motor) (i.e., the armature assembly is "high-temperature and high-vibration capable"). The armature assembly generally comprises an armature optimized for mass balance and flux carrying capacity and an armature spring comprising a variable cross-section torsion bar that provides a desired functional stiffness, functional stress, and resonance frequencies above 2000 Hertz (Hz) (or as high as possible) for all modes, except the primary torsional mode, such that vibration-induced stresses are reduced or substantially eliminated, thereby substantially preventing structural concerns and compensating for the lack of damping sources in the structure. As used herein, the term "functional stiffness" means the stiffness required to counteract the magnetic forces imparted on the armature assembly. The term "functional stress" means the stress incurred during actuation of the armature assembly.

Figure 1:
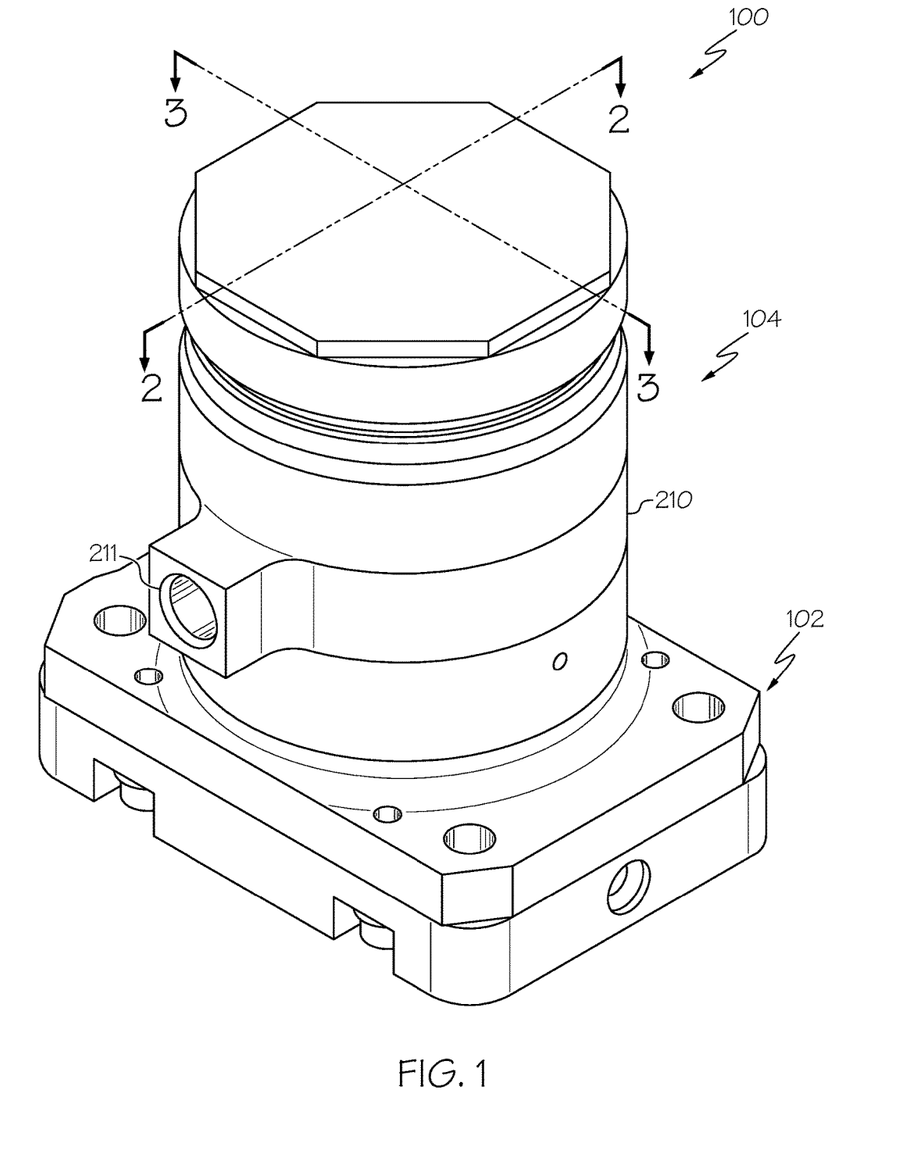
FIG. 1 is a perspective view of an exemplary valve assembly including a torque motor valve actuator according to various embodiments of the present disclosure.
Figure 2:
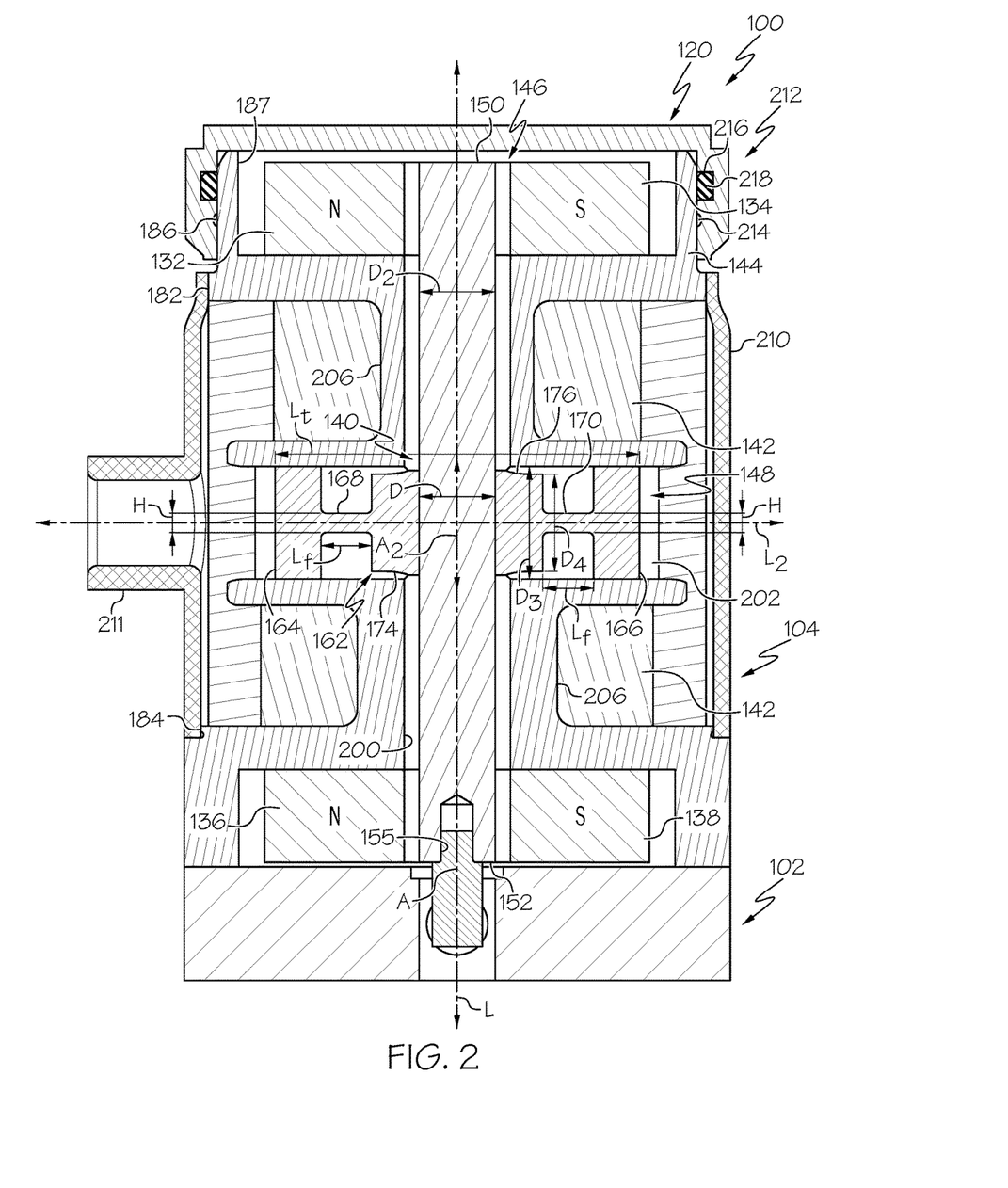
FIG. 2 is a cross-sectional partial view of the exemplary valve assembly of FIG. 1, taken along line 2-2 of FIG. 1, and including the torque motor valve actuator according to various embodiments of the present disclosure.
Figure 3:
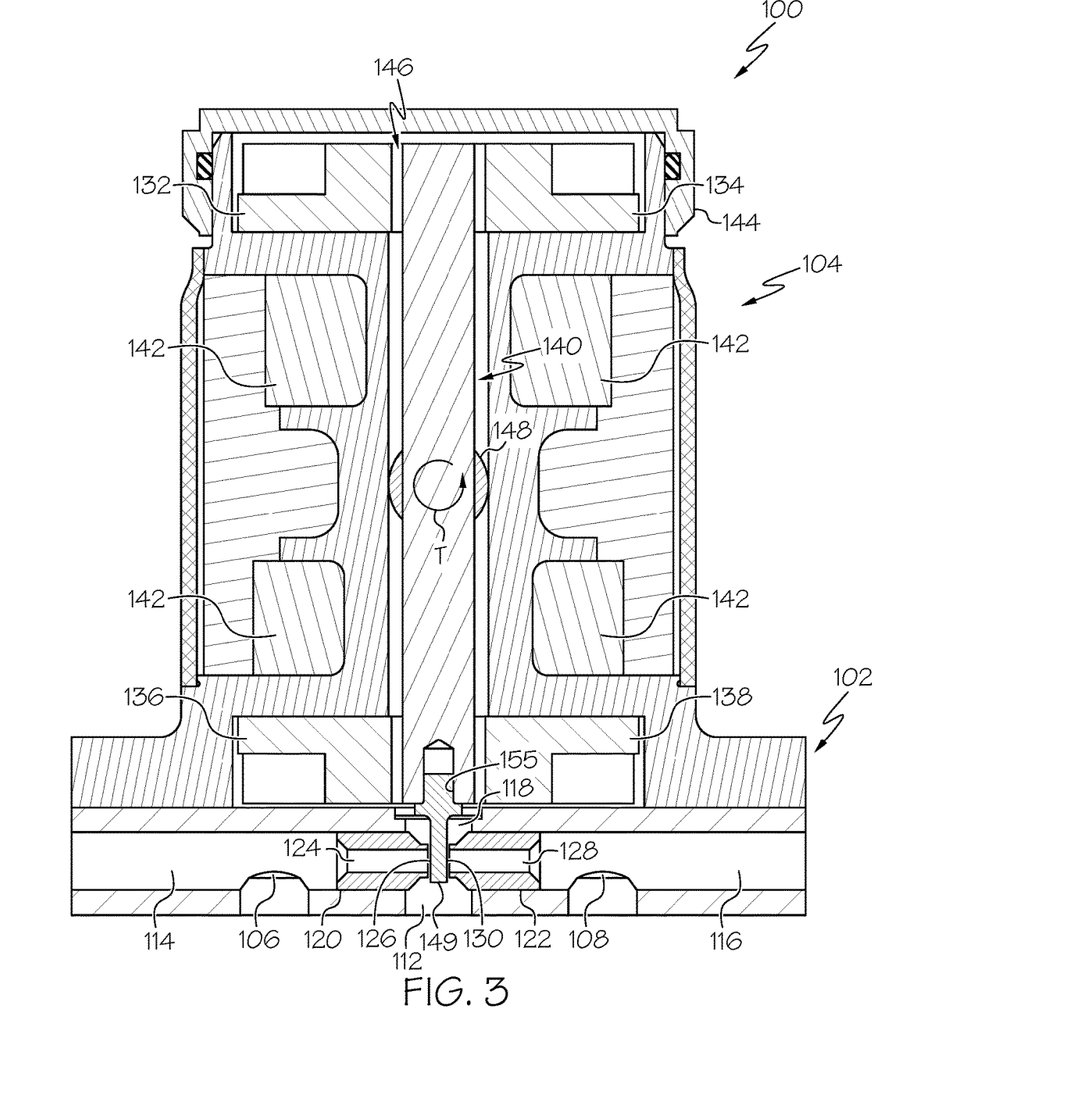
FIG. 3 is another cross-sectional view of the valve assembly of FIG. 1, taken along line 3-3 of FIG. 1, and including the torque motor valve actuator and a nozzle assembly (partially shown in FIG. 2)

Referring to FIGS. 1 and 2, in accordance with exemplary embodiments of the present disclosure, a valve assembly 100 is shown. In this example, the valve assembly 100 is a single-stage electro-hydraulic servo-valve (EHSV) and includes a valve housing 102 and a torque motor valve actuator 104. With reference to FIG. 3, the valve housing 102 includes a first housing inlet 106, a second housing inlet 108, and a housing outlet 112. The first housing inlet 106 and the second housing inlet 108 are each adapted to be coupled in fluid communication with a pressurized fluid source (not shown). It will be appreciated that the pressurized fluid medium may vary, and may be any one of numerous gaseous or liquid media. The housing outlet 112 is adapted to be coupled in fluid communication with a pressurized fluid load, such as, for example, a pneumatic or hydraulic valve, or simply be vented to atmosphere.

Referring to FIG. 3, the valve housing 102 additionally includes one or more nozzle cavities, for example, a first nozzle cavity 114 and a second nozzle cavity 116, and a flapper plenum 118. The first nozzle cavity 114 is in fluid communication with the first housing inlet 106 and the flapper plenum 118, and the second nozzle cavity 116 is in fluid communication with the second housing inlet 108 and the flapper plenum 118. The flapper plenum 118, which is disposed perpendicular to the first and second nozzle cavities 114, 116, is in fluid communication with the housing outlet 112.

The valve housing 102 also includes one or more nozzles, for example, a first nozzle 120 and a second nozzle 122, which are each mounted within the valve housing 102. In this example, the first nozzle 120 is mounted within the first nozzle cavity 114, and the second nozzle 122 is mounted within the second nozzle cavity 116. The first nozzle 120 includes a first nozzle inlet 124 and a first nozzle outlet 126, and the second nozzle 122 includes a second nozzle inlet 128 and a second nozzle outlet 130. The first nozzle 120 is configured such that the first nozzle inlet 124 is in fluid communication with the first housing inlet 106, and the first nozzle outlet 126 is disposed within the flapper plenum 118. The second nozzle 122 is configured such that the second nozzle inlet 128 is in fluid communication with the second housing inlet 108, and the second nozzle outlet 130 is disposed within the flapper plenum 118. Fluid flow through the first and second nozzles 120, 122, into the flapper plenum 118, and out the housing outlet 112 is controlled via the torque motor valve actuator 104.

Generally, the torque motor valve actuator 104 is coupled to the valve housing 102 and is adapted to be selectively energized by a remote power source. The torque motor valve actuator 104 is configured, upon being selectively energized, to selectively place the housing outlet 112 in fluid communication with either or both of the first nozzle outlet 126 and the second nozzle outlet 130. In one example, with reference to FIG. 2, the torque motor valve actuator 104 includes a first magnetic pole piece 132, a second magnetic pole piece 134, a third magnetic pole piece 136, a fourth magnetic pole piece 138, an armature assembly 140 and a coil 142, all of which are disposed within an actuator housing 144 (also referred to as a "bobbin").

The first magnetic pole piece 132 and the second magnetic pole piece 134 are of opposite magnetic polarities, and are spaced apart from each other to define a gap. For example, if the first magnetic pole piece 132 is of a north (N) magnetic polarity, the second magnetic pole piece 134 is of a south (S) magnetic polarity, and vice-versa.

It will be appreciated that the first magnetic pole piece 132 and the second magnetic pole piece 134 may be variously configured and implemented. For example, the first magnetic pole piece 132 and the second magnetic pole piece 134 may be coupled to, or form part of, a single permanent magnet. Alternatively, the first magnetic pole piece 132 and the second magnetic pole piece 134 may be coupled to, or form part of, separate magnets. For example, the first magnetic pole piece 132 may be coupled to, or form part of, a first permanent magnet, and the second magnetic pole piece 134 may be coupled to, or form part of, a second permanent magnet.

In this example, the torque motor valve actuator 104 includes the third magnetic pole piece 136 and the fourth magnetic pole piece 138. The third magnetic pole piece 136 and the fourth magnetic pole piece 138 are of opposite magnetic polarities, and are spaced apart from each other to define a gap. For example, if the third magnetic pole piece 136 is of a north (N) magnetic polarity, the fourth magnetic pole piece 138 is of a south (S) magnetic polarity, and vice-versa. It should be noted that the third magnetic pole piece 136 and the fourth magnetic pole piece 138 may be optional, such that the torque motor valve actuator 104 includes just the first magnetic pole piece 132 and the second magnetic pole piece 134.

It will be appreciated that the third magnetic pole piece 136 and the fourth magnetic pole piece 138, like the first magnetic pole piece 132 and the second magnetic pole piece 134, may be variously configured and implemented. For example, the third magnetic pole piece 136 and the fourth magnetic pole piece 138 may be coupled to, or form part of, a single permanent magnet. Alternatively, the third magnetic pole piece 136 and the fourth magnetic pole piece 138 may be part of separate magnets. For example, the third magnetic pole piece 136 may be coupled to, or form part of, a third permanent magnet, and the fourth magnetic pole piece 138 may be coupled to, or form part of, a fourth permanent magnet.

Figure 4:
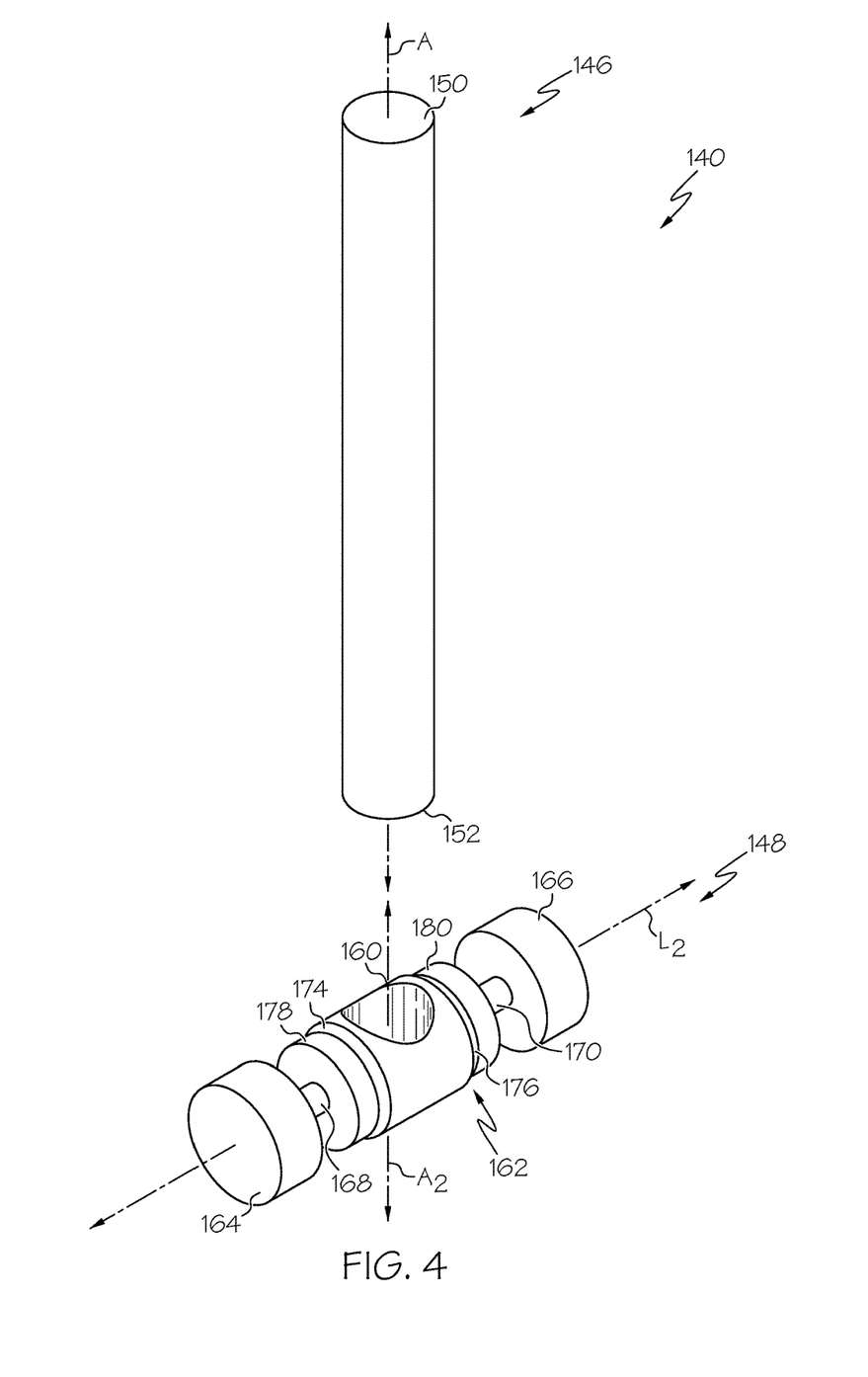
FIG. 4 is an expanded view of an exemplary armature assembly of the torque motor valve actuator of FIGS. 2 and 3, in accordance with various embodiments of the present disclosure.

In this example, the armature assembly 140 comprises an armature 146 and an armature spring 148. The armature 146 is fixedly coupled to the armature spring 148 and extends through the gap defined between the first magnetic pole piece 132 and the second magnetic pole piece 134, and the gap defined between the third magnetic pole piece 136 and the fourth magnetic pole piece 138, if included. The armature 146 includes a longitudinal axis A, which in this example, is substantially parallel to a longitudinal axis L of the torque motor valve actuator 104. With reference to FIGS. 2 and 4, the armature 146 includes a first end 150 and a second end 152. The first end 150 is opposite the second end 152, and the first end 150 may be positioned adjacent to the first magnetic pole piece 132 and the second magnetic pole piece 134 when the armature 146 is positioned within the actuator housing 144.

The second end 152 of the armature 146 is coupled to a flapper element 149, which is disposed in the flapper plenum 118 between the first and second nozzles 120, 122. In one example, the second end 152 includes a second bore 155. The second bore 155 may be formed via drilling, casting, electrical discharge machining, etc. Generally, the flapper element 149 is at least partially received within the second bore 155, and the flapper element 149 is fixedly coupled to the armature 146 within the second bore 155. In one example, the flapper element 149 is fixedly coupled to the second bore 155 via brazing; however, any suitable technique may be employed. In the example of coupling the flapper element 149 via brazing, the second end 152 of the armature 146 may include one or more holes in fluid communication with the second bore 155 to provide venting during the brazing of the flapper element 149 to the second bore 155. The armature 146 characteristics are defined by the end-use system. The armature 146 is sized to carry magnetic flux generated by the coil 142 and is composed of a metal or metal alloy, which may be cast, forged, printed through selective metal sintering, etc.

With reference to FIGS. 2 and 4, according to exemplary embodiments of the present disclosure, the armature 146 extends through a bore 160 defined in the armature spring 148. The armature 146 is fixedly coupled to the armature spring 148 within the bore 160. Generally, the armature 146 is fixedly coupled to the bore 160 of the armature spring 148 between the first end 150 and the second end 152. Thus, the armature spring 148 supports the armature 146 within the actuator housing 144. In one example, the armature spring 148 is coupled to the armature 146 by brazing or the like. The armature spring 148 is configured to bias the armature 146 to a null position, which is the position of the armature 146 depicted in FIG. 2. The armature spring 148 comprises a torsion bar that may be generally dumbbell-shaped overall with a variable cross-section as depicted. The armature spring 148 has a selected torsion bar length $L_t$ (FIG. 2) and cross section to reduce functional stress as hereinafter described.

The armature spring 148 (i.e., the torsion bar) includes a rigid central portion 162, a first end portion 164 opposite a second end portion 166, a first flexible portion 168 defined between the rigid central portion 162 and the first end portion 164, and a second flexible portion 170 defined between the rigid central portion 162 and the second end portion 166. The armature spring 148 is generally composed of a metal or metal alloy, and may be manufactured via casting, selective metal sintering, forging, etc. The rigid central portion 162, the first end portion 164 and the second end portion 166 have a larger outer diameter (i.e., they may be thicker or have a larger cross-section) than the first flexible portion 168 and the second flexible portion 170 to define the variable cross-sectional torsion bar. There may be different cross-sections throughout the length of the variable cross-sectional torsion bar, as long as the cross-sections generally follow a "larger-smaller-larger-smaller-larger" configuration. The rigid central portion 162, the first end portion 164 and the second end portion 166 have the "larger" cross-section relative to the "smaller" cross section of the first flexible portion 168 and the second flexible portion 170. The "larger" cross sectional portions may have the same cross-sectional shape and/or size or a different cross-sectional shape and/or size. The first flexible portion 168 and the second flexible portion 170 comprise reduced or the "smaller" cross-sectional portions of the armature spring 148 or torsion bar.

The rigid central portion 162, the first end portion 164 and the second end portion 166 may be generally cylindrical as depicted or may have other cross-sectional shapes that are the same or different from each other. $L_t$ is driven by the selected length of the rigid central portion 162 and the selected length of the first flexible portion 168 and the second flexible portion 170. The first end portion 164 and the second end portion 166 are respectively fixedly coupled to the actuator housing 144 by brazing or the like. In this example, the first end portion 164 and the second end portion 166 are sized to produce a good braze joint with the actuator housing 144 and have the actuator housing 144 be of appropriate thickness for structural integrity. The first end portion 164 and the second end portion 166 have a larger outer diameter (i.e., they may be thicker or have a larger cross-section) than the first flexible portion 168 and the second flexible portion 170 so that the functional stress and vibration-induced stress is not in the braze joints between the respective first end portion 164 and the second end portion 166, and the actuator housing 144.

Figure 5:
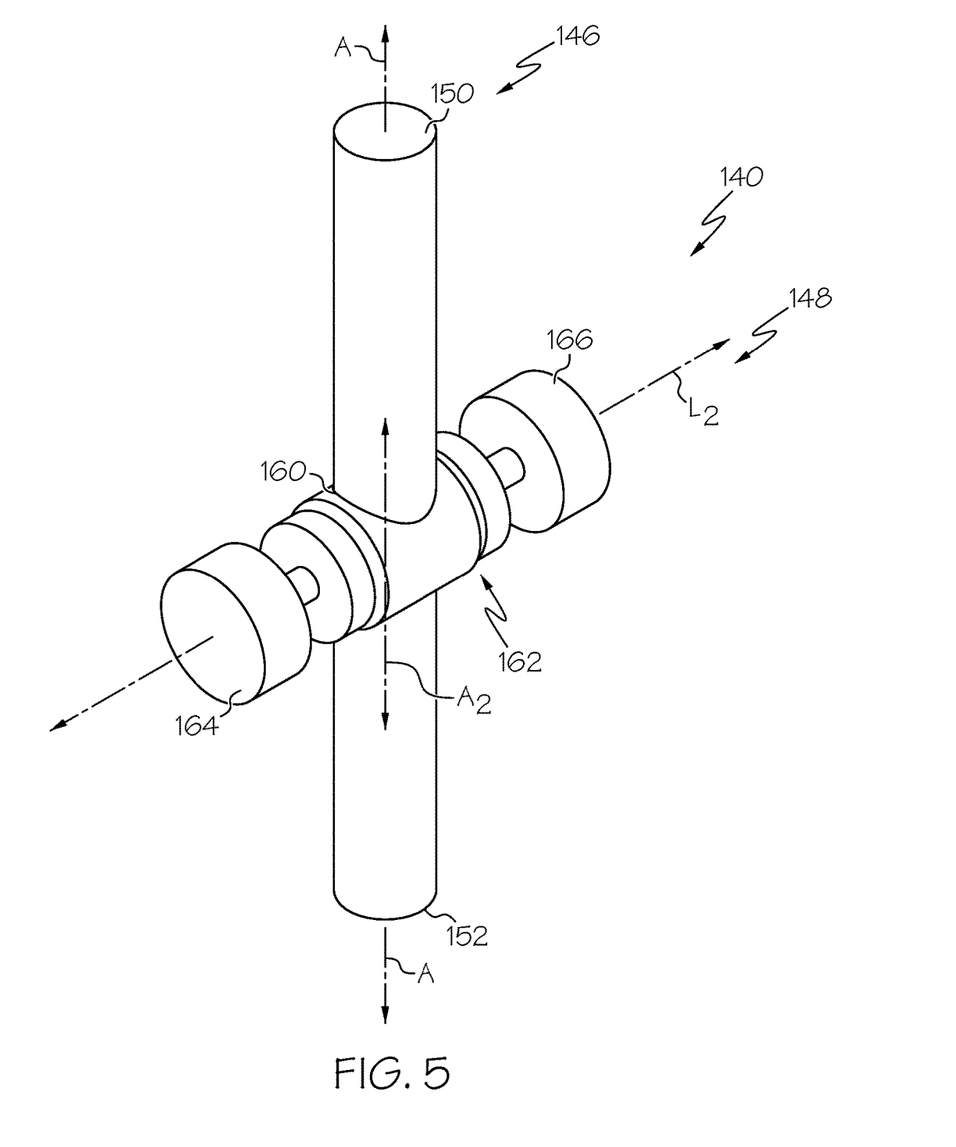
FIG. 5 is an isolation view of the armature assembly of FIGS. 2 and 3, in accordance with various embodiments.

With reference to FIG. 4, the bore 160 is defined through the rigid central portion 162. The bore 160 may be formed through electrical discharge machining, drilling, casting, etc. The bore 160 extends along an axis A2, which is substantially parallel with the axis A of the armature 146 (FIG. 2). The axis A2 is substantially transverse, and in this example, is substantially perpendicular to a longitudinal axis L2 of the armature spring 148 and the longitudinal axis L of the torque motor valve actuator 104 (FIG. 2). Thus, with reference to FIG. 5, the bore 160 is defined through the armature spring 148 so as to extend along the axis A2, which is substantially perpendicular to the longitudinal axis L2 of the armature spring 148 and substantially parallel to the axis A of the armature 146. The axis A2 is also substantially parallel to the longitudinal axis L of the torque motor valve actuator 104. With reference to FIG. 2, the bore 160 generally has a diameter D that is sized to correspond to a diameter D2 of the armature 146, such that the armature 146 may pass through the bore 160. Generally, the diameter D of the bore 160 is larger than the diameter D2 of the armature 146 to enable the armature 146 to be brazed or otherwise fixedly coupled within the bore 160.

In one example, with reference to FIG. 4, the rigid central portion 162 includes at least one tapered portion, and in this example, the rigid central portion 162 includes a first tapered portion 174 and a second tapered portion 176. In this example, the first tapered portion 174 is defined adjacent to a first portion end 178 of the rigid central portion 162, and the second tapered portion 176 is defined adjacent to a second portion end 180 of the rigid central portion 162. The bore 160 is defined through the rigid central portion 162 between the first portion end 178 and the second portion end 180. With reference back to FIG. 2, the first tapered portion 174 and the second tapered portion 176 provide a transition between a diameter D3 of the rigid central portion 162 adjacent to the bore 160 and a diameter D4 of the rigid central portion 162 adjacent to the respective first portion end 178 and the second portion end 180. It should be noted that while the rigid central portion 162 is described and illustrated herein as having the diameter D3, which is different than the diameter D4, the rigid central portion 162 may have a substantially uniform diameter.

The rigid central portion 162 increases the resonance frequencies of the armature assembly 133 above 2000 Hz (or as high as possible) for all modes, except the primary resonance frequency (the primary torsional mode). At resonance frequencies above 2000 Hz, the vibration-induced stresses are minimized, thereby adjusting for the lack of a damping source. The primary resonance frequency, while below 2000 Hz, is pre-set but is sufficiently damped because of magnet interaction. Adjustment of the primary resonance frequency is limited by the overall system design which is driven by the mass of the armature 146 and stiffness of the torsion bar or armature spring 148, which are in turn driven by the strength of the magnetics and system requirements including available current. The other resonance frequencies may be manipulated by adjustments to the mass and stiffness matrices defining structural resonance. According to exemplary embodiments of the present disclosure, the variable cross-section of the torsion bar allows for this manipulation while not increasing the packaging size of the armature assembly.

The first flexible portion 168 and the second flexible portion 170 are configured to twist in the direction of the arrow T of FIG. 3, to bias the armature 146 to the null position as shown. In this example, the cross-section of the first flexible portion 168 and the second flexible portion 170 is circular; however, the cross-section may be any shape, such as triangular, square, rectangular, diamond, etc. For example, with reference to FIG. 6, an armature spring 148' is shown. As the armature spring 148' is substantially similar to the armature spring 148, the same reference numerals will be used to denote the same or substantially similar features.

Figure 6:
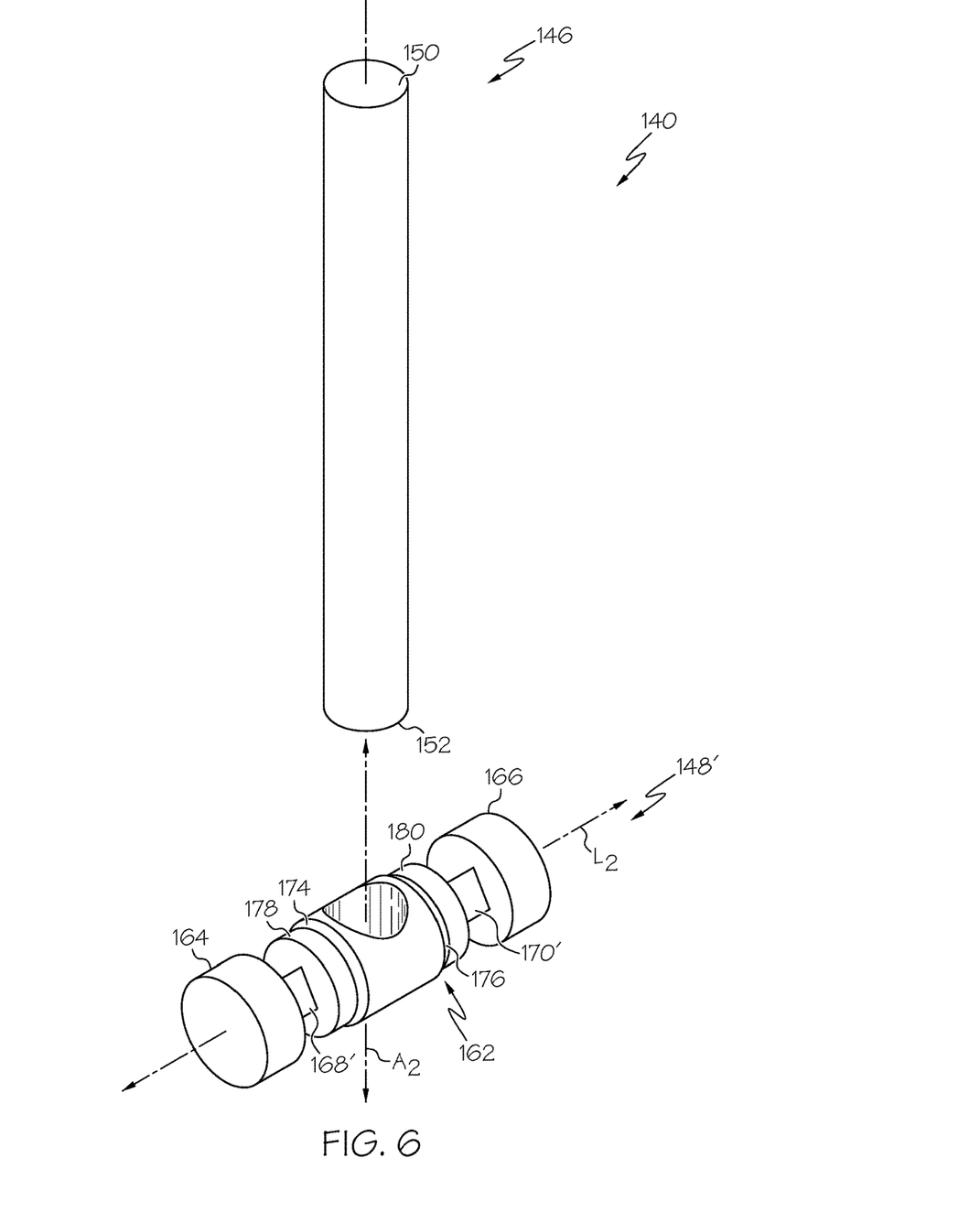
FIG. 6 is an expanded view of an exemplary armature assembly of the torque motor valve actuator of FIGS. 2 and 3, which includes an alternative armature spring, in accordance with various embodiments of the present disclosure.

In the example of FIG. 6, the armature spring 148' includes a first flexible portion 168' and a second flexible portion 170', which each have a triangular cross-section.

With reference back to FIG. 2, the orientation of the first flexible portion 168 and the second flexible portion 170 relative to the rigid central portion 162 of the armature spring 148 bar may be varied. In this example, first flexible portion 168 and the second flexible portion 170 are each coupled to a respective one of the first portion end 178 and the second portion end 180. The first flexible portion 168 and the second flexible portion 170 each have a selected length $L_f$, a selected height H, a selected width W (into the page), and a selected thickness (being less than the "thickness" of the rigid central portion 162, the first end portion 164 and the second end portion 166). The dimensions may be the same or different for both the first flexible portion 168 and the second flexible portion 170. The first flexible portion 168 and the second flexible portion 170 are sized to provide resonance frequencies above 2000 Hz (or as high as possible) for all modes, except the primary torsional mode. While the variable cross-sectional torsion bar has been described and depicted as one-piece, it is to be understood that the armature spring 148 may comprise more than one piece.

The torsion bar or armature spring 148 geometry (torsion bar length $L_t$, flexible portion length $L_f$, width (W), and height (H), and cross section) is selected to lower the armature assembly torsional rate (i.e., spring rate) in high temperature and high vibration environments, while maximizing structural integrity margins. To do so, operational requirements include a desired functional stress (e.g., below 30 ksi), a desired functional stiffness as measured by spring rate (Ka) of about 200 in-lb/rad (a high spring rate refers to deflection), and all resonance frequencies above 2000 Hz (or as high as possible) for all modes, except the primary modal frequency (i.e., the primary torsional mode). The variable cross section of the armature spring 148 reduces functional rate, functional stress, and vibration-induced stress. The first flexible portion 168 and the second flexible portion 170 are sized and shaped for the desired predetermined functional stiffness and desired (i.e., acceptable) functional stress. The total length $L_t$ of the armature spring 148 is also selected for an acceptable predetermined functional stress. The rigid central portion 162 allows for modal frequency tuning without affecting the functional stiffness. The outer diameter of the rigid central portion 162 is selected to obtain a sufficient frequency margin for modal frequencies above the primary modal frequency. In order to move the flapper element 149 at high temperatures, the functional stiffness needs to be low. However, a low functional stiffness may result in low modal frequencies that increase the torque motor susceptibility to vibration issues. The ability to obtain a low functional stiffness and high modal frequencies is a requirement for increased vibration capability (i.e., the ability to withstand high vibration environments).

As the armature 146 is at least partially disposed within the armature spring 148 (i.e., the armature 146 is partially disposed within and passes through the bore 160 defined in the rigid central portion 162 of the armature spring 148), the design allows for more flexibility to optimize for operating stresses as compared to those associated with an externally disposed armature and spring. This configuration also allows for using a relatively smaller and reduced mass armature 146. By reducing the size and mass of the armature 146, the actuator housing 144 has a smaller size, which provides for an increased winding volume for the coil 142. The increased winding volume for the coil 142 enables the coil 142 to have a larger diameter wire. As a result, the resistance of the coil 142 is decreased, which reduces power requirements. Moreover, the compact size and mass of the armature 146 also ensures that more of the magnetic flux that is generated by the coil 142 is used by the armature 146, resulting in increased efficiency in magnetic performance. This configuration also makes it easier to include the third magnetic pole piece 136 and the fourth magnetic pole piece 138, which provides an increased output force for the same input current, also reducing power requirements. In this example, the armature 146 has about a 57% reduction in diameter as compared to conventional armatures, which results in less mass, better flux path and increased packaging volume.

With reference to FIG. 2, the coil 142 surrounds at least a portion of the armature 146 and is disposed about the actuator housing 144 such that it is not surrounded by any of the first magnetic pole piece 132, second magnetic pole piece 134, the third magnetic pole piece 136 and the fourth magnetic pole piece 138. Generally, the coil 142 is positioned about the actuator housing 144 such that the coil 142 is arranged between the first magnetic pole piece 132 and second magnetic pole piece 134; and the third magnetic pole piece 136 and the fourth magnetic pole piece 138 along the longitudinal axis L. The coil 142 is adapted to receive electric current and is configured, upon receipt of the electric current, to generate a magnetic force that causes the armature 146 to rotate and thereby move the flapper element 149. For example, as depicted in FIGS. 2 and 3, depending upon the direction of the supplied electric current flow, the coil 142 will generate a magnetic force that causes the armature 146 to rotate in either a clockwise direction or a counter clockwise direction (from the perspective of FIGS. 2 and 3) to thereby place the housing outlet 112 in fluid communication with the first nozzle outlet 126 or the second nozzle outlet 130, respectively.

As the coil 142 is disposed external to the first magnetic pole piece 132, the second magnetic pole piece 134, the third magnetic pole piece 136 and the fourth magnetic pole piece 138, it can be larger than the coils that are used in presently known torque motor valve actuators without increasing the size of components that are typically mounted around the coil, such as the magnetic pole pieces. Further, by coupling the armature 146 within the bore 160 of the rigid central portion 162 of the armature spring 148, the size of the armature 146, and thus, the actuator housing 144 is reduced, which increases the available winding volume for the coil 142. As a result, a relatively larger wire may be used, which reduces coil resistance. Stated another way, by coupling the armature 146 to the bore 160 of the armature spring 148, the diameter D2 of the armature 146 is reduced, which allows for a reduction in the size and a diameter of the actuator housing 144. The reduced diameter of the actuator housing 144 results in the increase in winding volume for the coil 142, thereby enabling the use of the larger diameter wire. In this example, the reduced diameter of the actuator housing 144 results in about a 25% increase in turns of the wire as compared to presently known torque motor valve actuators, when the same type of wire is used. If the wire is 777x wire, which has a larger diameter than the wire used in the prior sentence, then there is about a 37% decrease in required power for the same number of turns as compared to presently known torque motor valve actuators. The coil 142 is also formed of suitable wire and using winding techniques that allow it to withstand relatively high temperatures. For example, it may withstand temperatures greater than about 260° C. Some examples of suitable wire, such as anodized aluminum embedded in electrically insulative, high thermal expansion ceramic, and suitable winding techniques are disclosed in U.S. Pat. No. 8,572,838, the entirety of which is incorporated herein by reference.

In the embodiments depicted in FIGS. 2 and 3, the torque motor valve actuator 104 includes only a single coil 142. It will be appreciated, however, that the torque motor valve actuator 104 may also be implemented with two or more coils. In these embodiments, one of the coils may be implemented as a back-up in the event the primary coil becomes inoperative.

The actuator housing 144 receives the armature assembly 140. The actuator housing 144 may be composed of a metal or metal alloy, and may be cast, forged, formed through selective metal sintering, etc. In this example, the actuator housing 144 includes a first housing end 182 opposite a second housing end 184, a first housing bore 200 and a second housing bore 202. The first housing end 182 supports the first magnetic pole piece 132 and the second magnetic pole piece 134. The first housing end 182 includes a flange 187, which extends upwardly from a perimeter of the first housing end 182. The flange 187 surrounds at least the first magnetic pole piece 132 and the second magnetic pole piece 134. The flange 187 defines a plurality of threads 186, which enable a top cover 190 to be coupled to the first housing end 182.

The second housing end 184 at least partially surrounds and at least partially encloses the third magnetic pole piece 136 and the fourth magnetic pole piece 138. The first housing bore 200 is defined to extend from the first housing end 182 to the second housing end 184. The first housing bore 200 receives the armature 146. The second housing bore 202 is defined to intersect the first housing bore 200, and receives the armature spring 148. In one example, the coil 142 is wound about the actuator housing 144 in at least one area 206 defined about the second housing bore 202.

In addition, with reference to FIGS. 2 and 3, a cover 210 may be disposed about the coil 142 between the first housing end 182 and the second housing end 184 of the actuator housing 144. The cover 210 is substantially cylindrical, and may be coupled to a potting compound that surrounds the coil 142. The cover 210 includes a conduit 211, which receives a portion of the coil 142 for coupling the coil 142 to a controller, which controllably supplies the coil 142 with electric current flow. The top cover 190 is substantially circular, and defines a flange 212. The flange 212 includes a plurality of threads 214, which matingly engage the plurality of threads 186 of the flange 187 of the first housing end 182. The flange 212 may also define a bore 216 for receipt of a seal 218, such as an O-ring.

From the foregoing, it is to be appreciated that the armature assembly 140 according to exemplary embodiments of the present disclosure achieves a low armature torsional rate (i.e., a spring rate) at high temperatures while also being able to withstand high vibration environments. The geometry of the armature spring 148 is optimized to achieve a functional stiffness (i.e., spring rate (Ka)) of about 300 inches-pounds/rad (300 in-lbf/rad), a functional stress below 29 ksi, and frequencies above 2000 Hertz (Hz) (or as high as possible) for all modes, except the primary torsional mode. Moreover, by positioning the armature 146 within and through the armature spring 148, the size of the armature 146 and the actuator housing 144 is reduced, which increases the winding volume for the coil 142 and thereby reduces coil resistance and power requirements.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A torque motor valve actuator for use with a valve assembly, comprising:
   an armature spring having a first end portion, a second end portion and a rigid central portion, the first end portion and the second end portion coupled to the rigid central portion by a respective flexible portion, the rigid central portion defining a bore that extends along a first axis; and
   an armature having a first end and a second end, the armature extending along a longitudinal axis that is substantially parallel to the first axis of the bore, and the armature is coupled to the bore of the armature spring between the first end and the second end.

2. The torque motor valve actuator of claim 1, wherein the armature spring extends along a second axis, which is substantially perpendicular to the first axis of the bore.

3. The torque motor valve actuator of claim 1, further comprising a flapper element coupled to the second end of the armature such that rotation of the armature moves the flapper element.

4. The torque motor valve actuator of claim 1, further comprising an actuator housing that defines a first bore that extends from a first housing end to a second housing end and receives the armature, and a second bore defined between the first housing end and the second housing end that intersects the first bore and receives the armature spring.

5. The torque motor valve actuator of claim 4, wherein at least one magnetic pole piece is positioned at one of the first housing end and the second housing end.

6. The torque motor valve actuator of claim 5, further comprising at least one coil that is wound about at least a portion of the actuator housing between the first housing end and the second housing end so as to be spaced a distance apart from the at least one magnetic pole piece and disposed external to the at least one magnetic pole piece.

7. The torque motor valve actuator of claim 1, wherein the rigid central portion of the armature spring includes a first rigid portion end and a second rigid portion end, and the bore is defined between the first rigid portion end and the second rigid portion end.

8. The torque motor valve actuator of claim 7, wherein the rigid central portion transitions from a first diameter adjacent to the bore to a second diameter adjacent to each one of the first rigid portion end and the second rigid portion end.

9. The torque motor valve actuator of claim 1, wherein each of the flexible portions have a first diameter, which is different than a second diameter of the rigid central portion.

10. A torque motor valve actuator for use with a valve assembly, the torque motor valve actuator comprising:
    an armature spring having a first end portion, a second end portion and a rigid central portion, the first end portion and the second end portion coupled to the rigid central portion by a respective flexible portion, the rigid central portion defining a bore that extends along a first axis;
    an armature having a first end and a second end, the armature extending along a longitudinal axis that is substantially parallel to the first axis of the bore, and the armature is fixedly coupled to the bore of the armature spring between the first end and the second end; and
    a flapper element coupled to the second end of the armature such that rotation of the armature moves the flapper element.

11. The torque motor valve actuator of claim 10, wherein the armature spring extends along a second longitudinal axis, which is substantially perpendicular to the first axis of the bore.

12. The torque motor valve actuator of claim 10, wherein the rigid central portion includes a first rigid portion end and a second rigid portion end, and the bore is defined between the first rigid portion end and the second rigid portion end.

13. The torque motor valve actuator of claim 12, wherein the rigid central portion transitions from a first diameter adjacent to the bore to a second diameter adjacent to each one of the first portion end and the second portion end.

14. The torque motor valve actuator of claim 10, wherein each of the flexible portions have a first diameter, which is different than a second diameter of the rigid central portion.

15. The torque motor valve actuator of claim 10, further comprising an actuator housing that defines a first bore that extends from a first housing end to a second housing end and receives the armature, the first housing end opposite the second housing end, and a second bore defined between the first housing end and the second housing end that intersects the first bore and receives the armature spring.

16. The torque motor valve actuator of claim 15, wherein at least one magnetic pole piece is positioned at the first housing end and at least one second magnetic pole piece is positioned at the second housing end.

17. The torque motor valve actuator of claim 16, further comprising at least one coil that is wound about at least a portion of the actuator housing between the first housing end and the second housing end so as to be spaced a distance apart from the at least one magnetic pole piece and disposed external to the at least one magnetic pole piece.

18. A torque motor valve actuator for use with a valve assembly, the torque motor valve actuator comprising:
    an armature spring having a first end portion, a second end portion and a rigid central portion, the first end portion and the second end portion coupled to the rigid central portion by a respective flexible portion, the rigid central portion defining a bore that extends along a first axis, the rigid central portion of the armature spring includes a first rigid portion end and a second rigid portion end and the bore is defined between the first rigid portion end and the second rigid portion end;

an armature having a first end and a second end, the armature extending along a longitudinal axis that is substantially parallel to the first axis of the bore, and the armature is coupled to the bore of the armature spring between the first end and the second end;

an actuator housing that defines a first bore that extends from a first housing end to a second housing end and receives the armature, and a second bore defined between the first housing end and the second housing end that intersects the first bore and receives the armature spring;

at least one magnetic pole piece is positioned at the first housing end;

at least one second magnetic pole piece positioned at the second housing end; and at least one coil wound about at least a portion of the actuator housing between the first housing end and the second housing end so as to be spaced a distance apart from and disposed external to the at least one magnetic pole piece and the at least one second magnetic pole piece.

19. The torque motor valve actuator of claim 18, further comprising a flapper element coupled to the second end of the armature such that rotation of the armature moves the flapper element.

20. The torque motor valve actuator of claim 18, wherein the armature spring extends along a second longitudinal axis, which is substantially perpendicular to the first axis of the bore.

* * * * *